(12) United States Patent
Morrell

(10) Patent No.: US 6,824,282 B1
(45) Date of Patent: Nov. 30, 2004

(54) REARVIEW MIRROR REDIRECTING SYSTEM

(76) Inventor: Douglas W. Morrell, 7053 La Praix St., Highland, CA (US) 92346

( * ) Notice: Subject to any disclaimer, the term of this patent is extended or adjusted under 35 U.S.C. 154(b) by 0 days.

(21) Appl. No.: 10/642,988

(22) Filed: Aug. 19, 2003

(51) Int. Cl.$^7$ ............................................. G02B 7/182
(52) U.S. Cl. ....................................... 359/877; 359/874
(58) Field of Search ................................. 359/874, 873, 359/875, 877, 872, 830, 843, 849

(56) References Cited

U.S. PATENT DOCUMENTS

| 4,105,301 A | 8/1978 | Doeg |
| 4,907,870 A | 3/1990 | Brucker |
| 5,097,362 A | 3/1992 | Lynas |
| 5,566,028 A | 10/1996 | Wodeslavsky |
| 5,745,310 A | 4/1998 | Mathieu |
| 6,193,380 B1 | 2/2001 | Jacobs |
| 6,672,731 B2 * | 1/2004 | Schnell et al. ............... 359/877 |

* cited by examiner

*Primary Examiner*—Euncha P. Cherry

(57) ABSTRACT

A rearview mirror redirecting system includes a housing having a back wall and a peripheral wall having a first side wall and a second side wall. A mirror has a first edge and a second edge. The first edge is pivotally attached to an inner surface of the first side wall. A first stop and a second stop are each mounted on an inner surface of the second side wall such that the second edge of the mirror is positioned between the first and second stops. The first stop is positioned adjacent to a peripheral edge of the peripheral wall. The second stop is positioned such that the mirror is angled downward when the second edge of the mirror is adjacent to the second stop. A driving assembly is mounted in the housing for selectively moving the second edge back and forth from the first stop to the second stop.

10 Claims, 4 Drawing Sheets

REARVIEW MIRROR REDIRECTING SYSTEM

BACKGROUND OF THE INVENTION

1. Field of the Invention

The present invention relates to rearview mirror directing devices and more particularly pertains to a new rearview mirror directing device for angling a rearview mirror outwardly away from a vehicle to better view a lane into which the vehicle is moving.

2. Description of the Prior Art

The use of rearview mirror directing devices is known in the prior art. These devices are used for viewing lanes adjacent to a vehicle so that a driver may see into the blind spots. While these devices fulfill their respective, particular objectives and requirements, the need remains for a device that not only directs a mirror outwardly away from a vehicle but also downward so that the mirror is in a proper position for viewing any blind spots of the vehicle.

SUMMARY OF THE INVENTION

The present invention meets the needs presented above by providing a pivoting mirror positioned between two stops. As the mirror moves between the stops, the mirror pivots outwardly away from the housing and downward.

Another object of the present invention is to provide a new rearview mirror directing device that is coupled to the turn signals so that the mirror is repositioned when the turn signal of the vehicle is actuated.

To this end, the present invention generally comprises a housing having a back wall and a peripheral wall that is attached to and extends forward from the back wall. The peripheral wall has a peripheral edge defining an opening in the housing. The peripheral wall includes a first side wall and a second side wall positioned opposite of each other. The first side wall is attached to the vehicle. A mirror has a reflective side, an upper edge, a lower edge, a first edge and a second edge. The mirror is positioned in the housing adjacent to the opening such that the reflective side of the mirror is directed outward of the opening. The first edge is pivotally attached to an inner surface of the first side wall. A first stop and a second stop are each mounted on an inner surface of the second side wall such that the second edge of the mirror is positioned between the first and second stops. The first stop is positioned adjacent to the peripheral edge. The second stop is positioned such that the mirror is angled downward when the second edge of the mirror is adjacent to the second stop. A driving assembly is mounted in the housing for selectively moving the second edge back and forth from the first stop to the second stop. An actuator is operationally coupled to the driving assembly for selectively turning the driving assembly on or off. The reflective side of the mirror is directed away from an adjacent side of the vehicle and downward when the driving assembly is turned on.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
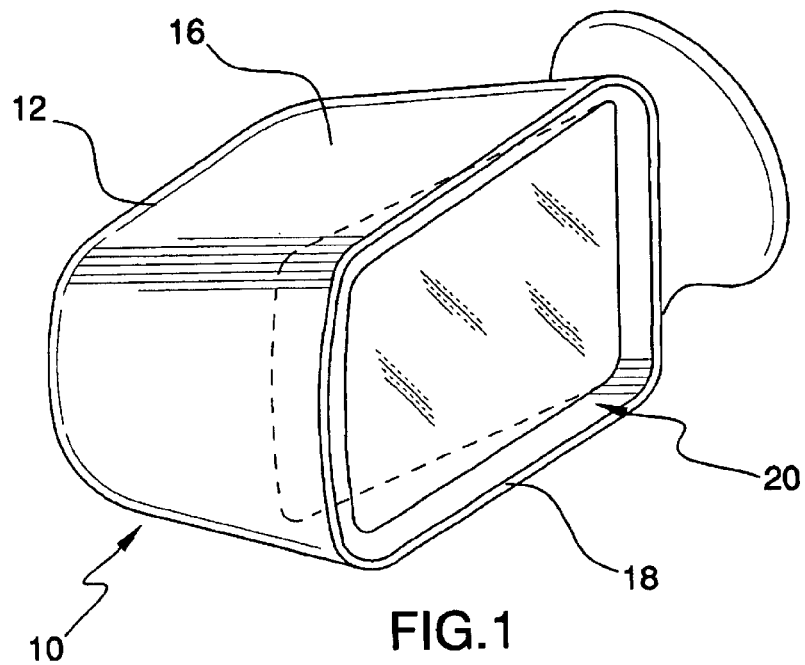
FIG. 1 is a schematic perspective view of a rearview mirror redirecting system according to the present invention.
Figure 2:
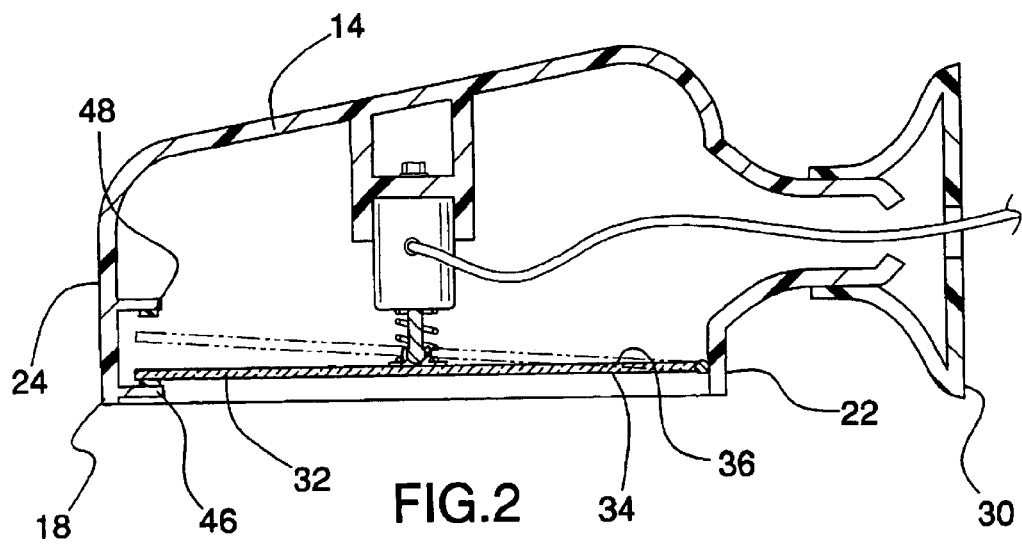
FIG. 2 is a schematic top cross-sectional view of the present invention.

With reference now to the drawings, and in particular to FIGS. 1 through 7 thereof, a new rearview mirror directing device embodying the principles and concepts of the present invention and generally designated by the reference numeral 10 will be described.

Figure 5:
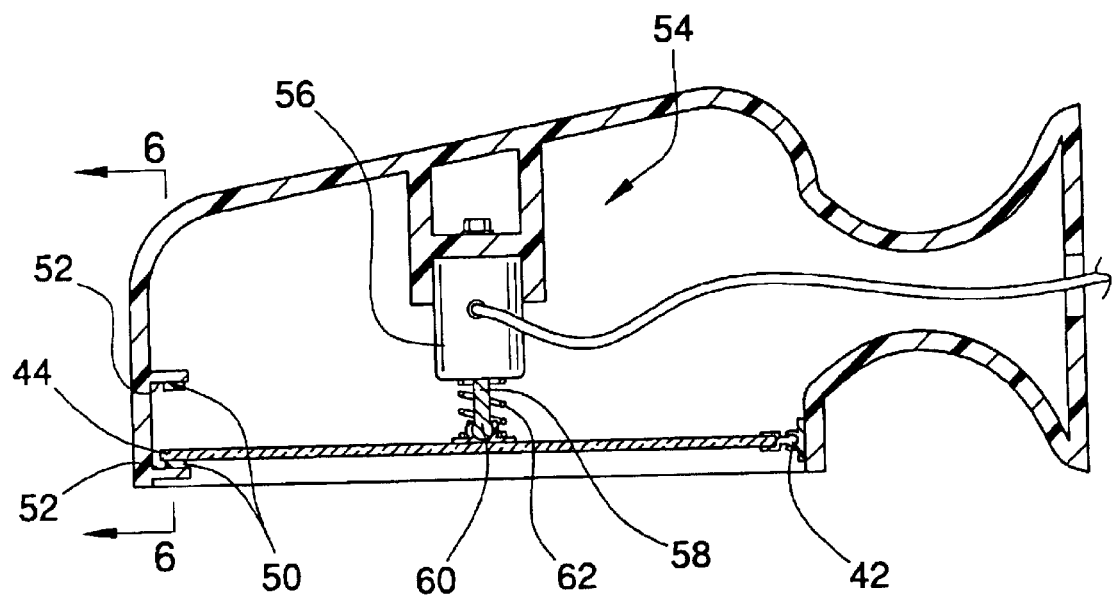
FIG. 5 is a schematic top cross-sectional view of the present invention.
Figure 6:
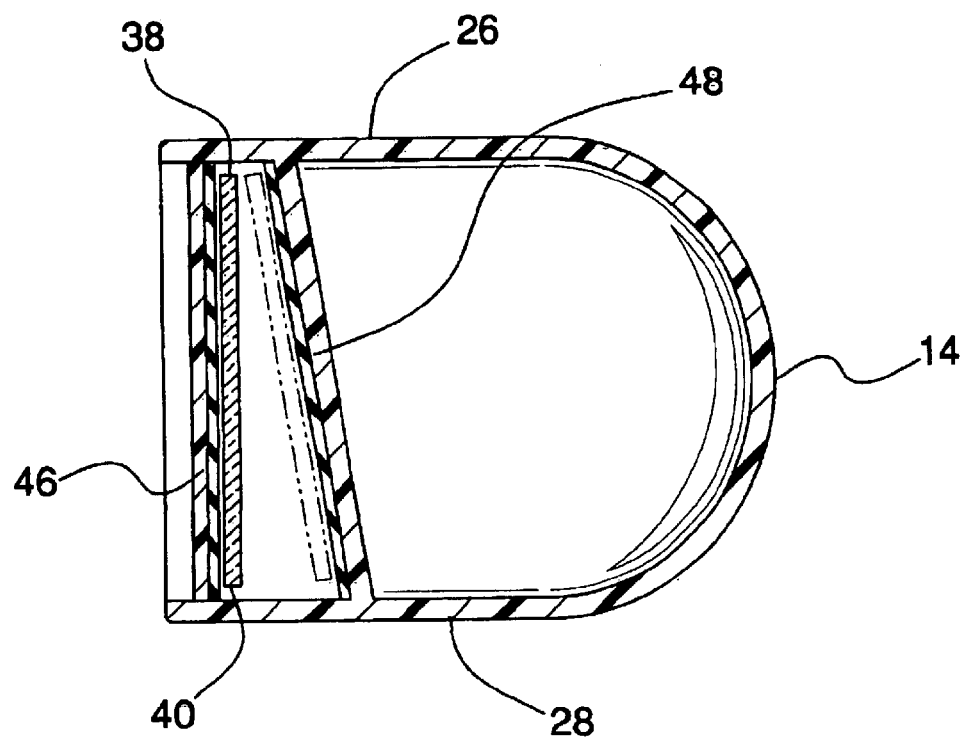
FIG. 6 is a schematic cross-sectional view taken along line 6—6 of FIG. 5 of the present invention.
Figure 7:
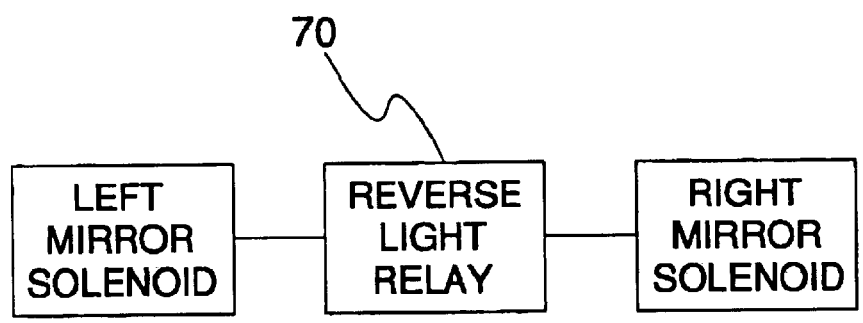
FIG. 7 is a schematic view of the present invention.

As best illustrated in FIGS. 1 through 7, the rearview mirror redirecting system 10 generally comprises a housing 12 having a back wall 14 and a peripheral wall 16 that is attached to and extends forward from the back wall 14. The peripheral wall 16 has a peripheral edge 18 defining an opening 20 extending into the housing 12. The peripheral wall 16 includes a first side wall 22 and a second side wall 24 positioned opposite of each other. A mounting 30 is preferably attached to the first side wall 22 for attaching the housing 12 to a side of vehicle 8. The mounting 30 preferably allows the housing 12 to be moved with respect to the vehicle and this may be accomplished with or without electrical automation. FIG. 5 depicts a version of the housing 12 without a movable mounting 30. It is also envisioned that the housing 12 may be movably mounted in an outer casing which is attached to the vehicle 8 and a motor driven mechanism is mounted within the casing for moving the housing as desired. Alternatively, the first side wall 22 may be attached directly to the vehicle using conventional methods.

A mirror 32 having a reflective side 34, an upper edge 38, a lower edge 40, a first edge 42 and a second edge 44 is positioned in the housing 12 adjacent to the opening 20 such that the reflective side 34 of the mirror 32 is directed outward of the opening 20. The first edge 42 is pivotally attached to an inner surface of the first side wall 22 so that mirror 32 may be pivoted at an angle with respect to vertical and also so that the second edge 44 may be moved with respect to the peripheral edge 18 of the second side wall 24.

A first stop 46 and a second stop 48 is each mounted on an inner surface of the second side wall 24 such that the second edge 44 of the mirror 32 is positioned between the first 46 and second 48 stops. Each of the first 46 and second 48 stops comprises an elongated flange generally extending from a top wall 26 to a bottom wall 28 of the housing 12. The first stop 46 is positioned generally adjacent to the peripheral edge 18 and the second stop 48 is spaced from the first stop 46. The first stop 46 is substantially vertically orientated and the second stop 48 is angled with respect to the first stop 46 such that an angle formed by the second stop 48 and the top wall 26 is greater than an angle formed by the second stop 48 and the bottom wall 28. The first 46 and second 48 stops each have an inner surface 52 facing each other. A cushioning material 50 is mounted on the inner surfaces 52 of the first 46 and second 48 stops. The cushioning material 50 preferably comprises an elastomeric material.

Figure 3:
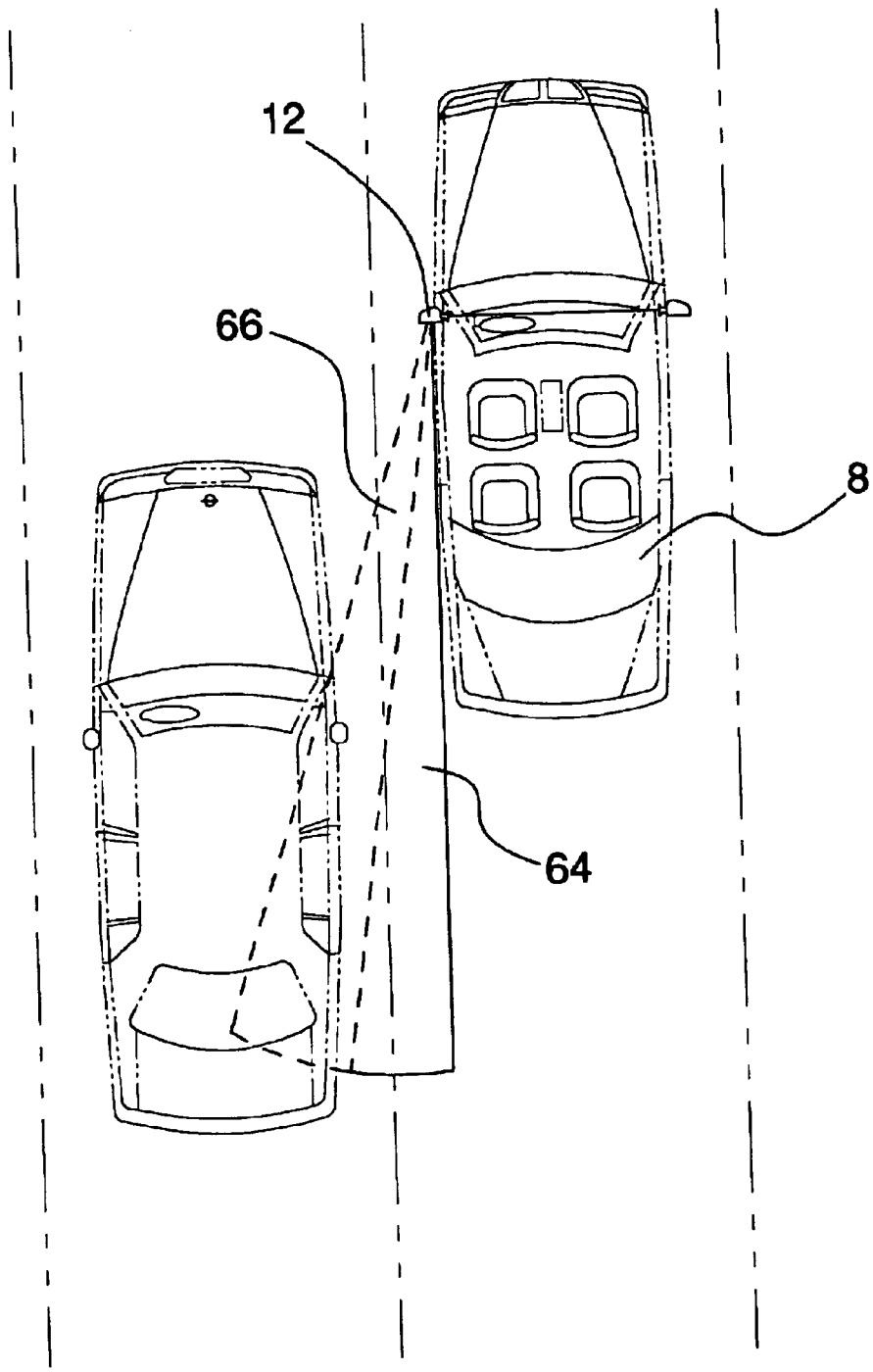
FIG. 3 is a schematic in-use view of the present invention.
Figure 4:
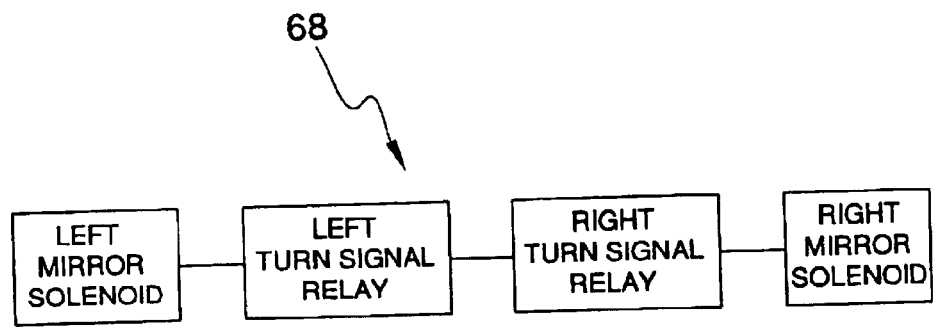
FIG. 4 is a schematic view of the present invention.

A driving assembly 54 is mounted in the housing 12 for selectively moving the second edge 44 back and forth from the first stop 46 to the second stop 48. The driving assembly 54 includes a solenoid 56 mounted in the housing 12 on the back wall 14. A piston 58 extends outward from and is mechanically coupled to the solenoid 56. The piston 58 has a free end 60 pivotally attached to a non-reflective side 36 of the mirror 32. The free end 60 is moved toward the solenoid 56 when the solenoid 56 is turned on such that the second edge 44 is moved toward the second stop 48. A biasing means 62 is mounted in the housing 12 for biasing the mirror 32 toward the first stop 46. The biasing means 62 preferably comprises a spring mounted on the piston 58 and extends between the solenoid 56 and the mirror 32. FIG. 3 shows the viewing angle of the mirror as it moves from a first position 64 adjacent to the first stop 46 and a second position 66 adjacent to the second stop 48.

An actuator 68 is operationally coupled to the driving assembly 54 for selectively turning the driving assembly 54 on or off. The actuator 68 preferably comprises a turn signal of the vehicle 8 so that the solenoid 56 is turned on when the turn signal, or actuator 68, is actuated for signaling a turn in the same direction as a side of the vehicle on which the mirror 32 is mounted. Preferably the system 10 includes a pair of mirror and housing combinations, each mounted on a different side of the vehicle 8. When the left turn signal is actuated, the left mirror is repositioned and when the right turn signal is actuated, the right mirror is actuated. Optionally, the driving assembly or assemblies is operationally coupled to the reverse light relay 70 of the vehicle 8 so that both mirrors move outward when the driver shifts the vehicle 8 into reverse. This will provide better viewing when backing-up a vehicle 8.

In use, a driver of the vehicle 8 adjusts the housing 12 so that the user may properly see rearward of the vehicle 8. When the driver turns on their signal, the reflective side 34 of the mirror 32 is directed away from an adjacent side of the vehicle 8 and downward. This gives the driver of the vehicle a view of the roadway adjacent to the vehicle 8 to ensure it is safe to move into that lane. The movement of the mirror 32 effectively eliminates blind spots on the side of the vehicle 8. The spring 62 keeps the mirror 32 in a secure position adjacent to the first stop 46 and also ensures that the mirror 32 will remain in the proper position should the solenoid 56 fail. The mirror 32 is angled downward when the solenoid 56 is turned on because, generally speaking, a driver's head is positioned higher than their mirror so their mirror 32 is angled upwardly when in its normal position. If the mirror 23 were simply angled outwardly away from the vehicle 8 without being moved downward, the driver would be viewing higher than an optimal position.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rearview mirror repositioning system for positioning on a vehicle, said system comprising:

a housing having a back wall and a peripheral wall being attached to and extending forward from said back wall, said peripheral wall having a peripheral edge defining an opening in said housing, said peripheral wall including a first side wall and a second side wall positioned opposite of each other, said first side wall being attached to the vehicle;

a mirror having a reflective side, an upper edge, a lower edge, a first edge and a second edge, said mirror being positioned in said housing adjacent to said opening such that said reflective side of said mirror is directed outward of said opening, said first edge being pivotally attached to an inner surface of said first side wall;

a first stop and a second stop being mounted on an inner surface of said second side wall such that said second edge of said mirror is positioned between said first and second stops, said first stop being positioned adjacent to said peripheral edge, said second stop being positioned such that said mirror is angled downward when said second edge of said mirror is adjacent to said second stop;

a driving assembly being mounted in said housing for selectively moving said second edge back and forth from said first stop to said second stop;

an actuator being operationally coupled to said driving assembly for selectively turning said driving assembly on or off; and wherein said reflective side of said mirror is directed away from an adjacent side of the vehicle and downward when said driving assembly is turned on.

2. The system of claim 1, wherein each of said first and second stops comprising an elongated flange generally extending from a top wall to a bottom wall of said housing.

3. The system of claim 2, wherein said first stop is substantially vertically orientated, said second stop being angled with respect to said first stop such that an angle formed by said second stop and said top wall is greater than an angle formed by said second stop and said bottom wall.

4. The system of claim 3, wherein said first and second stops has an inner surface facing each other, a cushioning material being mounted on said inner surfaces of said first and second stops.

5. The system of claim 1, wherein said driving assembly includes a solenoid mounted in said housing, a piston extending outwardly from and being mechanically coupled to said solenoid, said piston having a free end pivotally attached to a non-reflective side of said mirror, wherein said free end is moved toward said solenoid when said solenoid is turned on such that said second edge is moved toward said second stop.

6. The system of claim 5, wherein said driving assembly further includes a biasing means being mounted in said housing for biasing said mirror toward said first stop.

7. The system of claim 6, wherein said biasing means comprising a spring mounted on said piston and extending between said solenoid and said mirror.

8. The system of claim 3, wherein said driving assembly includes a solenoid mounted in said housing, a piston extending outwardly from and being mechanically coupled to said solenoid, said piston having a free end pivotally attached to a non-reflective side of said mirror, wherein said free end is moved toward said solenoid when said solenoid is turned on such that said second edge is moved toward said second stop.

9. The system of claim 8, wherein said driving assembly further includes a biasing means being mounted in said housing for biasing said mirror toward said first stop.

10. A rearview mirror repositioning system for positioning on a vehicle, said system comprising:

a housing having a back wall and a peripheral wall being attached to and extending forward from said back wall, said peripheral wall having a peripheral edge defining an opening in said housing, said peripheral wall including a first side wall and a second side wall positioned opposite of each other;

a mounting being attached to said first side wall for attaching said housing to a side of the vehicle;

a mirror having a reflective side, an upper edge, a lower edge, a first edge and a second edge, said mirror being positioned in said housing adjacent to said opening such that said reflective side of said mirror is directed outward of said opening, said first edge being pivotally attached to an inner surface of said first side wall;

a first stop and a second stop being mounted on an inner surface of said second side wall such that said second edge of said mirror is positioned between said first and second stops, each of said first and second stops comprising an elongated flange generally extending from a top wall to a bottom wall of said housing, said first stop being positioned generally adjacent to said peripheral edge and said second stop being spaced from said first stop, said first stop being substantially vertically orientated, said second stop being angled with respect to said first stop such that an angle formed by said second stop and said top wall is greater than an angle formed by said second stop and said bottom wall, said first and second stops having an inner surface facing each other, a cushioning material being mounted on said inner surfaces of said first and second stops, said cushioning material comprising an elastomeric material;

a driving assembly being mounted in said housing for selectively moving said second edge back and forth from said first stop to said second stop, said driving assembly including;

a solenoid mounted in said housing;

a piston extending outwardly from and being mechanically coupled to said solenoid, said piston having a free end pivotally attached to a non-reflective side of said mirror, wherein said free end is moved toward said solenoid when said solenoid is turned on such that said second edge is moved toward said second stop;

a biasing means being mounted in said housing for biasing said mirror toward said first stop, said biasing means comprising a spring mounted on said piston and extending between said solenoid and said mirror;

an actuator being operationally coupled to said driving assembly for selectively turning said driving assembly on or off, said actuator comprising a turn signal of the vehicle; and wherein said reflective side of said mirror is directed away from an adjacent side of the vehicle and downward when said driving assembly is turned on.

* * * * *